United States Patent [19]

Townsend

[11] 4,270,330
[45] Jun. 2, 1981

[54] RIDGE BATTEN BRACKET

[75] Inventor: Roger Townsend, Reigate, England

[73] Assignee: Redland Roof Tiles Limited, Reigate, England

[21] Appl. No.: 69,101

[22] Filed: Aug. 21, 1979

[30] Foreign Application Priority Data

Aug. 25, 1978 [GB] United Kingdom ............... 34626/78

[51] Int. Cl.³ .............................................. E04B 1/38
[52] U.S. Cl. ............................................ 52/712; 52/90
[58] Field of Search ................ 52/714, 715, 712, 370, 52/697, 696, 643, 90; 85/11, 13

[56] References Cited

U.S. PATENT DOCUMENTS

| 1,803,723 | 5/1931 | Murphy | 52/370 X |
|---|---|---|---|
| 2,920,477 | 1/1960 | Shaw | 52/715 |
| 3,184,800 | 5/1965 | Nelson | 52/714 X |
| 3,256,030 | 6/1966 | Banse | 52/712 X |
| 3,727,358 | 4/1973 | Howell | 52/712 X |
| 3,889,441 | 6/1975 | Fortine | 52/715 |
| 4,022,537 | 5/1977 | Gilb et al. | 52/715 X |

FOREIGN PATENT DOCUMENTS

| 7310764 | 8/1973 | Netherlands | 52/90 |
|---|---|---|---|
| 368132 | 3/1932 | United Kingdom . | |
| 871309 | 6/1961 | United Kingdom . | |
| 1179267 | 1/1970 | United Kingdom . | |
| 1350518 | 4/1974 | United Kingdom . | |
| 1493599 | 11/1977 | United Kingdom . | |

*Primary Examiner*—Price C. Faw, Jr.
*Assistant Examiner*—Carl D. Friedman
*Attorney, Agent, or Firm*—Young & Thompson

[57] ABSTRACT

A ridge batten bracket (17) has two first portions (18) which are attached to the rafters (10) of a roof structure. The first portions have trays (21) to engage the rafters to locate the bracket which is then nailed in position. The ridge batten (15) is supported by two second portions (19) of the bracket each of which is bent in situ to wrap around the batten (15) so that the second portion (19) engages all four sides of the batten (15).

4 Claims, 3 Drawing Figures

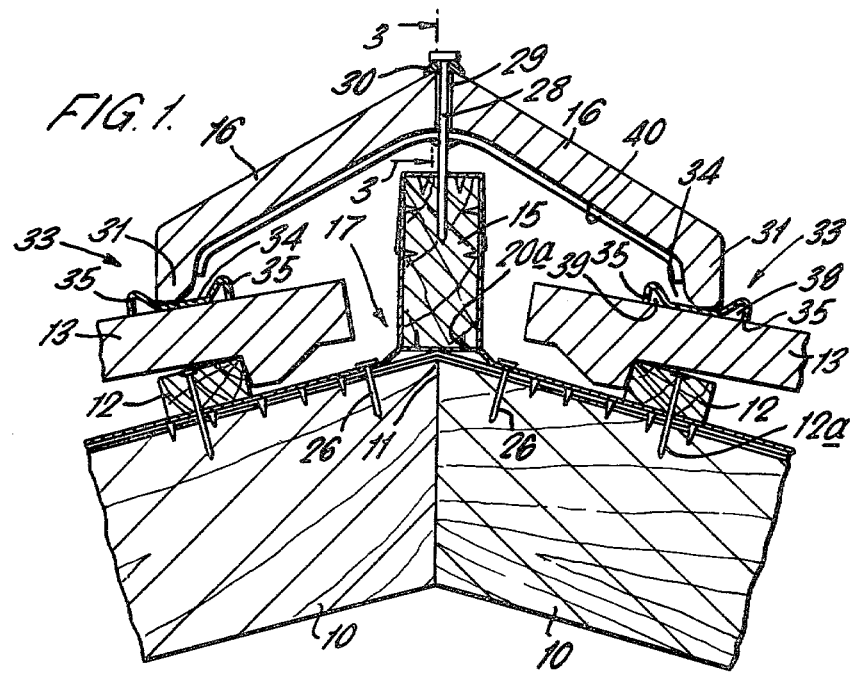
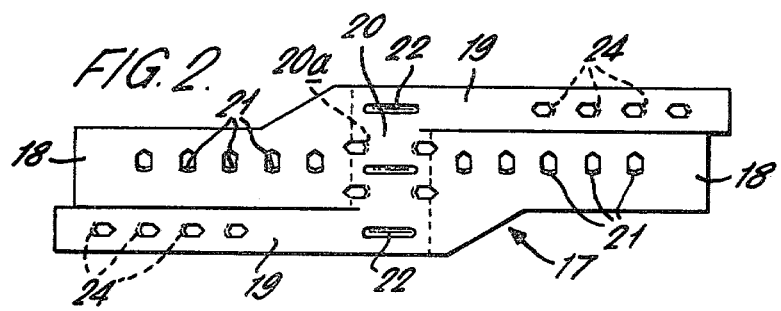
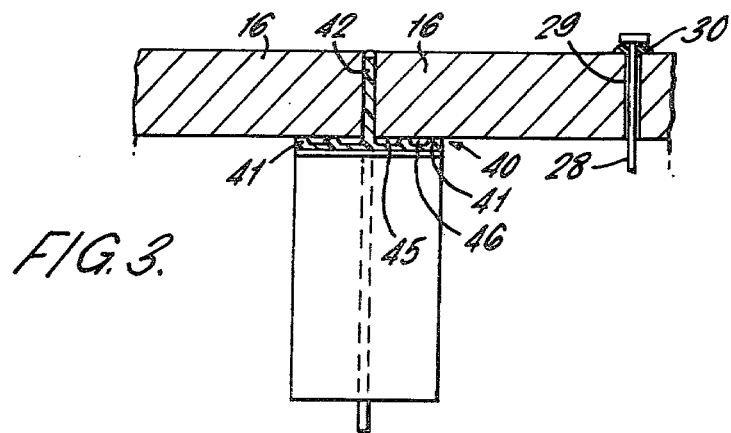

RIDGE BATTEN BRACKET

The invention relates to a bracket for attaching ridge battens to the rafters of a roof structure and provides such a bracket comprising a first portion or portions having means for fixing said first portion or portions to the rafters and a second portion or portions having means for fixing said second portion or portions to the ridge batten in which the second portion or portions are bent in situ to engage at least three sides of the ridge batten.

Preferably the second portion or portions each engage all four sides of the ridge battens.

Preferably there are two portions, one for engaging each of a pair of rafters, the two first portions being aligned, and preferably there are two second portions offset from one another, so that the batten is engaged by the second portions at two spaced locations.

The bracket may be formed from a plate, the second portions extending in opposite directions from a centre line of the plate and comprising parts of opposed sides of the plate and the first aligned portions also extending in opposite directions from the centre line.

Preferably the fixing means of the first and/or second portion or portions comprises pointed tangs integrally formed with the bracket.

The invention also includes a roof structure including a bracket as described above.

A preferred embodiment of the invention will now be described, by way of example, with reference to the accompanying drawings, in which:

FIG. 1 is a section through the ridge of a tiled pitched roof embodying the invention;

FIG. 2 is an underneath plan view of the ridge batten supporting bracket of the roof of FIG. 1, and FIG. 3 is a section along the line 3—3 of FIG. 1.

Referring to the drawings, and particularly FIG. 1, a portion of a tiled pitched roof is shown in which wooden rafters 10, arranged in pairs, meet at an apex 11. Wooden battens 12 are nailed to the rafters at spaced intervals on either side of the apex or ridge 11 and roofing tiles 13 are laid on the battens 12.

The uppermost course of tiles 13 on either side of the ridge is shown in FIG. 1 and the gap between these courses is closed by a ridge covering including a ridge batten 15 to which are secured ridge caps or tiles 16 of known type.

The ridge batten 15 extends longitudinally above the apex 11 and is secured to the pairs of rafters 10 by brackets 17.

As shown in FIG. 2, each bracket 17 consists of a metal plate cut and punched to form two first rafter engaging portions 18 and two second batten engaging portions 19. Each rafter engaging portion 18 is a rectangular tongue which extends from a central portion 20 of the plate and includes tangs 21 punched out from the plate and projecting towards a viewer when looking at FIG. 2. The two portions 18 are aligned and extend in opposite directions from the central portion 20 which includes strengthening ribs 22. The central portion 20 has tangs 20a punched therefrom which, looking at FIG. 2, extend away from the viewer.

The two batten engaging portions 19 of the bracket 17 also extend in opposite directions from the central portion 20 and are arranged one on each side of the rafter engaging portions 18 as shown in FIG. 2. Tangs 24 are also formed in the batten engaging portions 19 of the bracket, punched out from the plates, and extending away from the viewer looking at FIG. 2. The use of the bracket 17 is as follows. Before fixing the uppermost battens 12 the brackets 17 are attached to each of the pairs of rafters 10 by bending the portions 18 downwardly to conform to the pitch angle of the rafters and by hammering the tangs 21 through a roofing felt laid over the rafters into the rafters 10. The uppermost battens 12 are then attached overlying the portions 18 and each nail fastening 12a therefor passes through the battens, the portions 18, the roofing felt and into the rafter 10. Thereafter nails 26 are used to aid the attachment of the bracket to the rafters and to give added strength and rigidity to the system. The ridge batten 15 is then positioned overlying all of the brackets 17 and is hammered to cause the tangs 20a to penetrate thereinto to provide temporary fixing of the batten 15. The portions 19 of the bracket 17 are thereafter bent up and wrapped around the batten 15 to take up the positions shown in FIG. 1, the tangs 24 thereof being forced into the two sides and upwardly facing edge thereof to secure it in position. Thus, the lower surface of the batten is supported on the central portion 20 of the bracket and each portion 19 engages the three other sides of the batten 15 so that the batten is very firmly fixed to the rafters. It will also be appreciated that because the portions 19 are offset, the batten is secured at two spaced positions above each pair of rafters 10. Extra nails may be driven through each portion 19 of the bracket 17 into the upper surface of the ridge batten for extra strength.

As can be seen from FIG. 1, the ridge caps 16 are generally C-shaped in cross-section and are secured to the ridge batten 15 by nails 28 passing through holes 29 in the ridge caps and into the batten 15. Plain neoprene washers 30 are provided between the heads of the rails 28 and the upper surface of the tiles 16 which washers 30 deform as the nails 28 are driven into the ridge batten 15 thus to seal the holes 29 against the ingress of water.

The edges 31 of the ridge caps extend parallel to the batten 15 and above the roofing tiles 13. To seal the gaps between the ridge caps and roofing tiles, sealing members 33 are provided. Each sealing member or strip 33 is an elongate member of asphalt bonded asbestos sheet material including an upwardly facing channel 34 and two downwardly extending skirts 35 each of which is shaped to conform to the contours of the roofing tiles 13. In use, the sealing member is placed on the roofing tiles 13 with the skirts 35 locating on the contours of the roofing tiles and the ridge cap is then fixed in position with one edge in the channel 34. It will be appreciated that the channel 34 is of constant depth and that the skirts 35 vary in depth along their length other than when used with a plain tile. It is believed that the shape of the sealing strip 33 assists in preventing the ingress of driven rain, or splashing rain, into the interior of the roof by the provision of two tranquil zones 38, 39 across which it will be difficult for water to travel. Along the roof the strips 33 are simply abutted in end to end relationship; however, to add rigidity to the system the ends of each strip are provided with a half cut rebate joint which is complementary to that of a preceding strip.

The gaps between adjacent ridge caps 16 are sealed by plastics sealing members 40 (see FIGS. 1 and 3). As can be seen in FIG. 1, the sealing member 40 is shaped to provide primary and secondary water channels 45, 46 and, as can be seen from FIG. 3, the sealing member is T-shaped in cross-section. Edges of adjacent ridge tiles 16 rest on the arms 41 of the T and the upright 42 of the T extends upwardly between the adjacent ridge caps. The depending ends of the T-shaped sealing member 40 extend to just above the channels 34 of the strips 33 and thus any water entering the primary and secondary channels is led away via the strips 33 and the tiles extending therebeneath.

A major advantage of the above described ridge covering is that it provides a "dry" ridge covering, that is to say one which is constructed without the use of mortar or a like bonding agent.

I claim:

1. A bracket as claimed in claim 1 in which the second portions each engage all four sides of the ridge batten.

2. A bracket as claimed in claim 1 in which the fixing means of the first portions comprises pointed tangs integrally formed with the plate and extending from the plate on the opposite side to the tangs of the second portions.

3. A roof structure comprising at least one pair of rafters and a ridge batten extending horizontally above the rafters in which ridge batten is attached to the rafter by a bracket as claimed in claim 1.

4. A bracket for attaching a ridge batten to rafters of a roof structure and comprising a plate formed to provide two aligned first portions extending in opposite directions from a center line of the bracket, and including means for fixing said first portions to rafters, and two second portions offset from one another and extending in opposite directions from the center line one on each side of and substantially parallel to the first portions, the second portions including integrally formed pointed tangs and in which the second portions are bent in situ to engage at spaced locations at least three sides of the ridge batten and are secured thereto by the tangs.

* * * * *

UNITED STATES PATENT AND TRADEMARK OFFICE
CERTIFICATE OF CORRECTION

PATENT NO. : 4,270,330

DATED : June 2, 1981

INVENTOR(S) : Roger Townsend

It is certified that error appears in the above-identified patent and that said Letters Patent is hereby corrected as shown below:

Column 3, line 12, "1." first occurrence should read -- 2. --.

Column 3, line 14, "2." should read -- 3. --.

Column 4, line 1, "3." should read -- 4. --.

Column 4, line 5, "4." should read -- 1. --.

Signed and Sealed this

Ninth Day of August 1983

[SEAL]

Attest:

GERALD J. MOSSINGHOFF

Attesting Officer

Commissioner of Patents and Trademarks